United States Patent

[11] 3,552,358

| [72] | Inventor | James M. Launder |
| --- | --- | --- |
| | | Wabash, Ind. |
| [21] | Appl. No. | 671,770 |
| [22] | Filed | Sept. 29, 1967 |
| [45] | Patented | Jan. 5, 1971 |
| [73] | Assignee | Horizons Unlimited Problems Solved By Ideas Corporation (HUPSI) |
| | | Wabash, Ind. |
| | | a corporation of Indiana |

[54] ANIMAL HOUSE AIR-CONDITIONING AND MANURE DISPOSAL SYSTEM
9 Claims, 7 Drawing Figs.

[52] U.S. Cl. .................................................. 119/22, 119/48
[51] Int. Cl. ...................................................... A01k 31/00
[50] Field of Search ........................................... 119/22, 17, 18, 48, 21

[56] References Cited
UNITED STATES PATENTS

| 1,918,125 | 7/1933 | Petersime ...................... | 119/17X |
| 2,388,157 | 10/1945 | Kerr ............................. | 119/17X |
| 2,523,615 | 9/1950 | Fell .............................. | 119/22 |
| 2,969,040 | 1/1961 | Siptrott ........................ | 119/22X |
| 3,119,375 | 1/1964 | Ernst............................ | 119/48 |

Primary Examiner—Hugh R. Chamblee
Attorney—Jeffers and Young

ABSTRACT: Animal manure is dropped into a trough of chilled liquid running beneath openings in the floor of an animal house. The chilled liquid stabilizes the manure, conveys it to a convenient location for disposal and/or utilization, and cools and dehumidifies the air in the animal house.

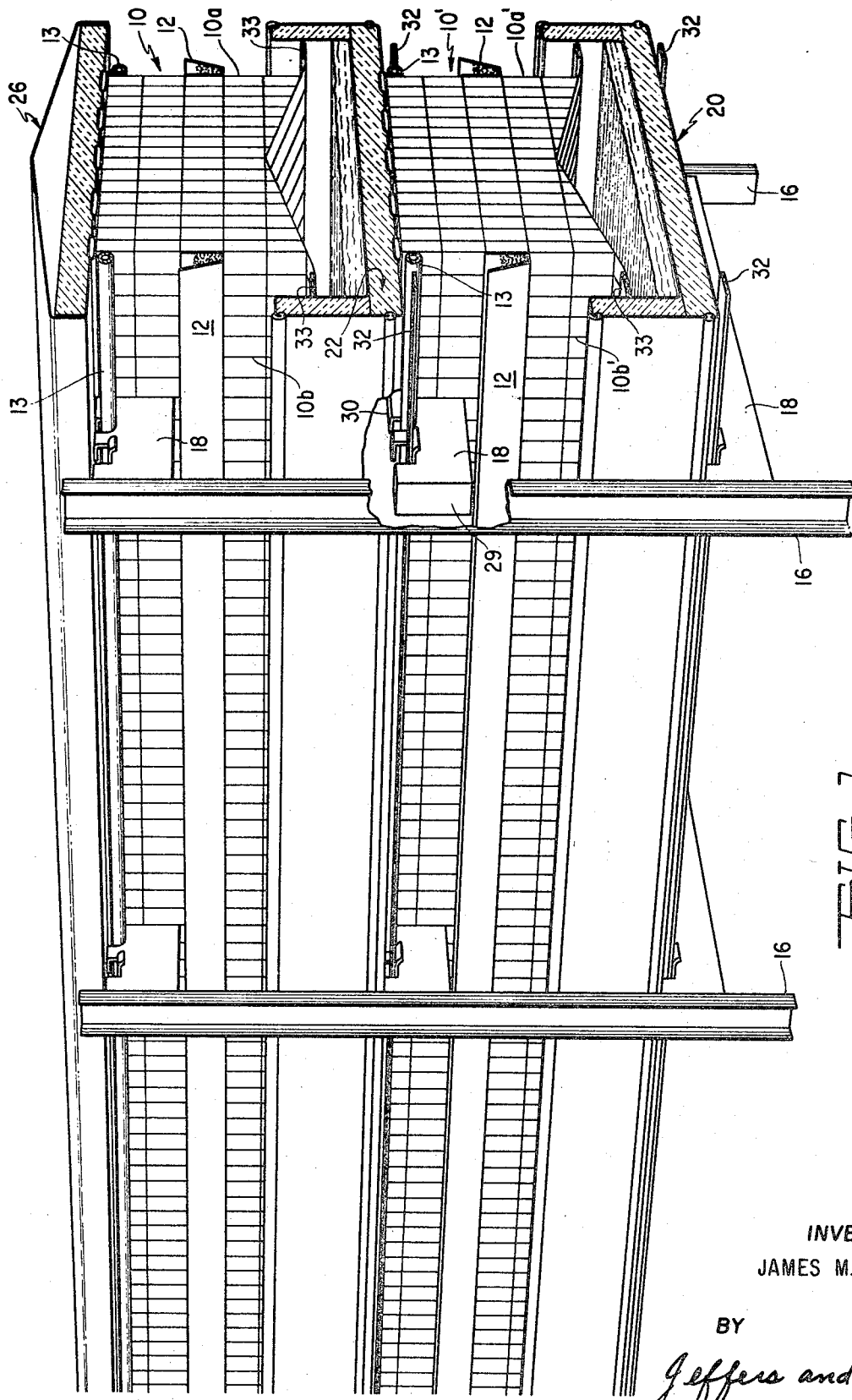

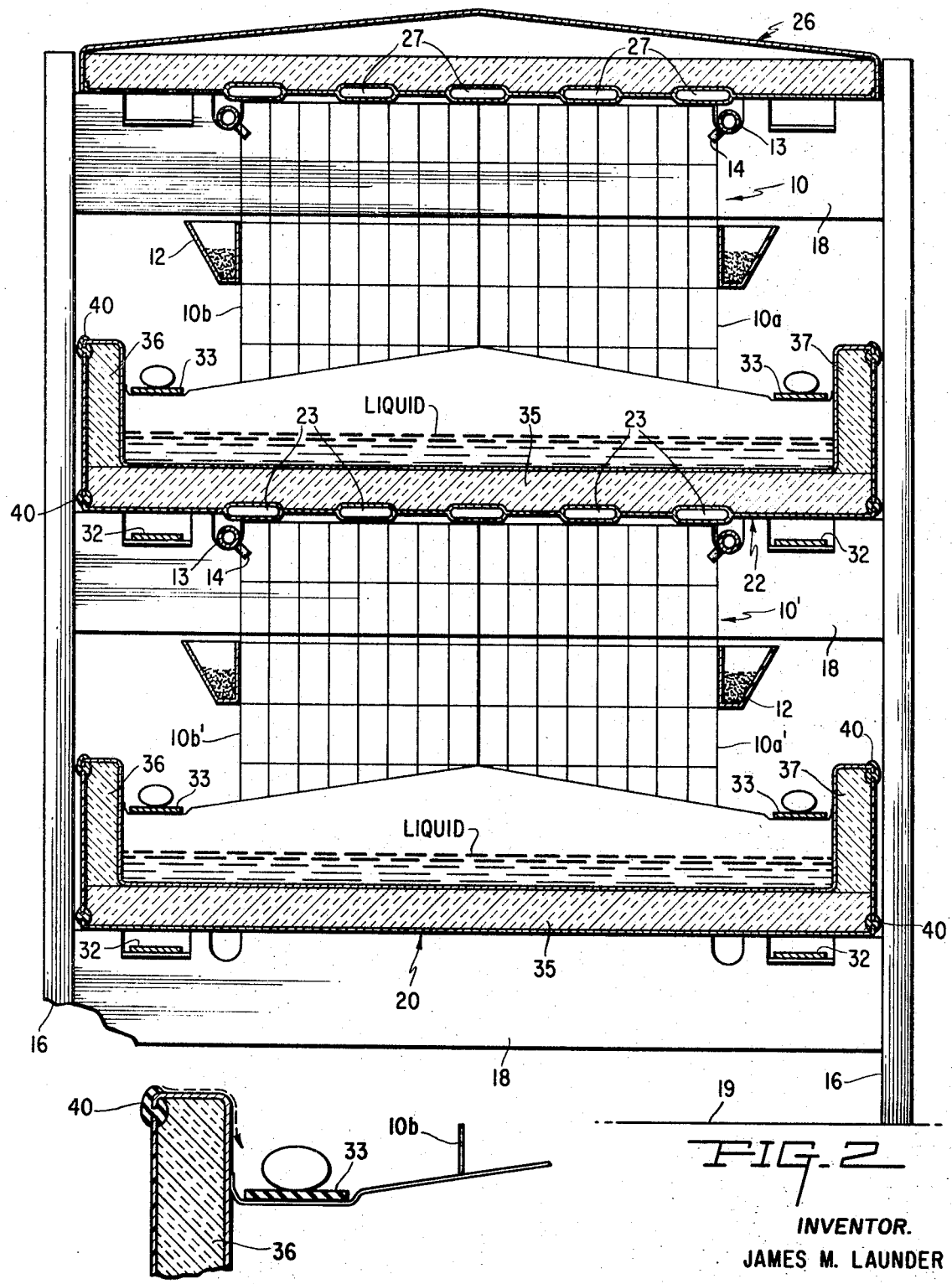

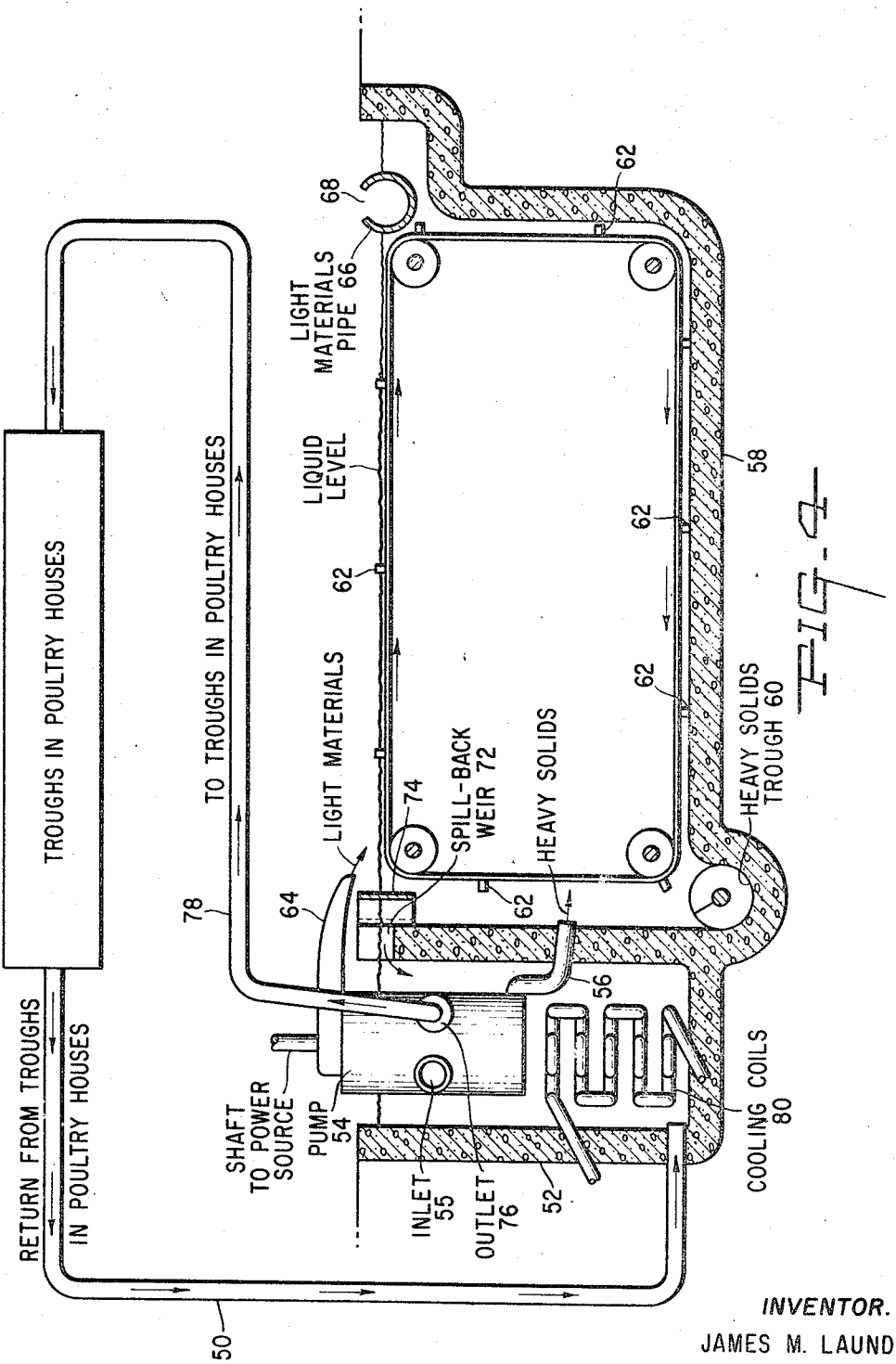

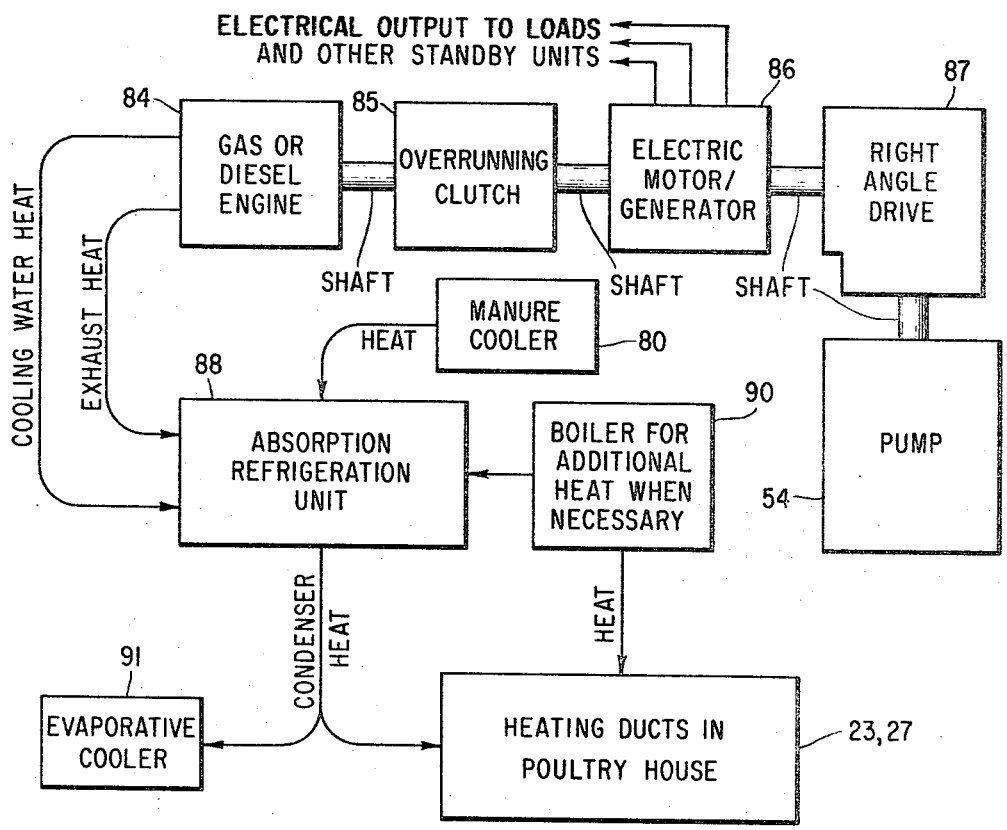
FIG. 5
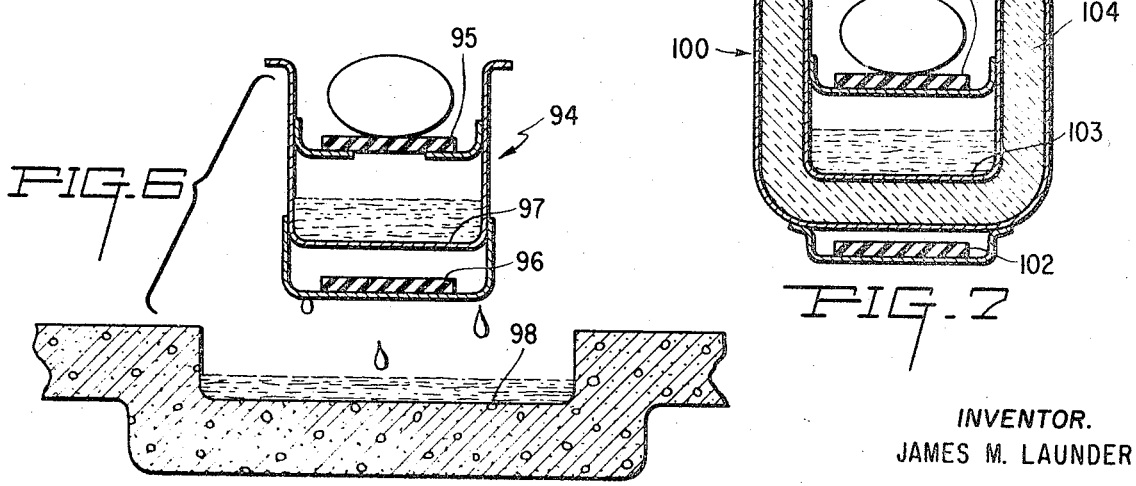
FIG. 6
FIG. 7
INVENTOR.
JAMES M. LAUNDER
BY
Jeffers and Young
ATTORNEYS

ANIMAL HOUSE AIR-CONDITIONING AND MANURE DISPOSAL SYSTEM

BACKGROUND OF THE INVENTION

My invention relates to an air-conditioning and manure-disposal system, and particularly to an air-conditioning and manure-disposal system for an animal house.

In barns, yards, and houses for animals, particularly poultry houses for producing eggs, disposal of the manure is a major problem. In a typical poultry house, a large number of poultry cages are positioned side by side at an elevated level in long rows. Manure dropped from the cages is usually permitted to fall on a floor or in a pit, where it remains for an indeterminate length of time. In some poultry houses, this manure is removed only after older poultry has been taken out to be replaced by younger poultry. In such cases, the manure may remain on the floor for more than a year, and sometimes it is never cleaned out. But even if the manure is removed at fixed times, it may remain on the floor for several months, since it is difficult to remove the manure and the process of removal disturbs the poultry. During the time that the manure does remain on the floor, it is detrimental to the poultry house. First, the manure releases odors and foreign matter which are obnoxious to humans, and which may carry diseases to the poultry. Second, the manure attracts rodents and scavengers. Third, the food value or fertilizing value of the manure decreases with the time it is allowed to stand or remain on the floor. Fourth, the manure releases a considerable amount of moisture which must be removed by ventilation, particularly in cold weather when ventilation would not otherwise be required. Fifth, since the manure must be allowed to fall to the floor, it has not been possible to have the cages above one another in tiers, thus losing valuable space. Sixth, it is difficult for men or machinery to operate around and under the poultry cages to remove the manure from the pit or floor.

Accordingly, an object of my invention is to provide an improved manure-disposal system for an animal house or yard.

Another object of my invention is to provide a poultry house manure-disposal system utilizing a cool liquid that reduces the undesirable effects of the manure, that helps retain the desirable properties and value of the manure, and that air-conditions and dehumidifies the poultry house.

Another object of my invention is to provide a manure-disposal system which prevents the manure from being exposed to the atmosphere and carries it away as soon as it is dropped.

Another object of my invention is to provide a manure-disposal system for a poultry house which prevents the manure from releasing odors and other foreign matter in the poultry house.

Another object of my invention is to provide an improved poultry house manure-disposal system which reduces or substantially eliminates its accessibility and attraction to rodents and scavengers.

Another object of my invention is to provide an improved poultry manure-disposal system that retains much of the food and fertilizer valve of the manure.

Another object of my invention is to provide a manure-disposal system for an animal house that also air-conditions the house and controls the temperature and humidity thereof.

Another object of my invention is to provide a poultry house manure-disposal system which permits rows of poultry cages to be placed above each other in tiers.

Another object of my invention is to provide an improved manure-disposal system which does not require men or machinery to get beneath the animals to remove the manure.

Another object of my invention is to provide cooling or chilling of eggs as soon as they are laid.

SUMMARY OF THE INVENTION

Briefly, these and other objects are achieved in accordance with my invention by a liquid-carrying trough that is open at the top, and that extends beneath a floor area with openings, such as wire poultry cages. Means are connected to one end of the trough for supplying a stream of liquid, preferably cool water and added chemicals, to the trough. Further means are connected to the other end of the trough for removing the liquid from the trough. If the length of the trough is relatively long, it may be sloped downward from the one end where the liquid is supplied toward the other end where the liquid is removed. The stream of liquid is preferably continuous, and has sufficient depth and velocity to carry manure along as it is dropped into the trough from above. At the discharge end of the trough, some constituents of the manure may be removed from some of the liquid in any suitable fashion. The liquid is then recirculated. As materials are constantly being removed from the liquid and some liquid is removed from time to time, the amount of solids in the liquid reaches a maximum and the liquid need not be replaced.

The cool liquid stabilizes and cools the manure almost as soon as it enters the liquid. This cooling and the chemicals inhibit the bacterial growth which causes breakdown of the manure, so that odors and foreign matter are not released. This stabilization of the manure reduces the attraction to rodents and scavengers, and the inhibition of bacterial growth prevents or reduces the loss of food value or fertilizer value.

The cool liquid flowing in the house also provides air-conditioning which reduces the amount of ventilation required and the moisture in the air in the house, particularly in warm, damp weather or climates, or when the house is closed to preserve warmth in cold weather. The cool liquid also provides a cool, moist space which is particularly useful in poultry houses to provide a cool, moist space for eggs, as soon as they are laid.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 1 shows a perspective view of two tiers of poultry cages utilizing my manure-disposal system;

FIG. 2 shows a transverse cross-sectional view of the cages and manure-disposal system of FIG. 1;

FIG. 3 shows an enlarged cross-sectional view of a portion of the system of FIG. 2;

FIG. 4 shows a diagram of the liquid flow in my manure-disposal system and one arrangement for removing manure constituents from the liquid;

FIG. 5 shows a block diagram of cooling and heating machinery, and associated equipment, in a poultry house utilizing my invention; and FIGS. 6 and 7 show improved egg conveyors which are particularly adapted to be used with my manure-disposal system and its liquid.

DESCRIPTION OF THE PREFERRED EMBODIMENTS

FIGS. 1 and 2 show two tiers of conventional wire poultry cages 10,10' used with a manure-disposal system in accordance with my invention. Typically, the cages 10,10' are arranged in a row of front cages 10a,10a' and a row of back cages 10b, 10b', each cage holding some predetermined number of poultry. The rows of cages extend longitudinally in a direction for any desired length, depending upon the size of the poultry house. Since my manure-disposal system permits the cages, 10,10' to be positioned above each other in tiers, I have shown two such tiers in FIGS. 1 and 2. More or less tiers of cages may be used. The cages 10,10' are provided with suitable feed troughs 12 and water pipes 13 with drinking valves 14. A plurality of vertical posts or channels 16 are longitudinally spaced along both sides of the cages 10,10'. Horizontal plate members 18 extend transversely between the vertical posts 16 beneath the lower cages 10', beneath the upper cages 10, and above the upper cages 10. The lower plate members 18 are preferably positioned some suitable distance above a floor 19 (indicated in FIG. 2). A trough 20 is supported on the lower members 18, a trough 22 and heating ducts 23 are supported on the intermediate members 18, and a roof 26 and heating ducts 27 are supported on the upper members 18. The roof 26 may be desirable to catch dust, dirt, and feathers that can be easily removed. The members 18 may be fabricated from suitable sheet metal, bent along vertical lines to form ends 29 which can be fastened to the posts 16, and bent along horizontal lines to form tops 30 which support the troughs 20,22 and the roof 26. The members 18 are also punched to form openings and support for the water pipes 13 and to form openings and support for the return portion 32 of egg conveyor belts 33 which pass by the cages 10,10' to receive eggs. The cages 10,10' usually are made in sets so that the lower cages 10' may be suspended from the heating ducts 23 and the intermediate members 18, and the upper cages 10 may be suspended from the heating ducts 27 and the upper members 18. Each of the troughs 20,22 comprises a bottom 35, and sides 36,37 which are either of joined or integral construction to form a liquidtight structure that is open at its top beneath the cages 10,10' for carrying liquid. The troughs 20,22 extend longitudinally for the length of the cages 10,10' and are sufficiently wide to receive all of the manure, feathers, and feather dust dropped from the cages 10,10'.

The egg conveyor belts 33 are supported by the structure of the cages 10,10', and are respectively positioned at the sides 36,37 of the troughs 20,22. These egg conveyor belts 33 are positioned adjacent the sides 36,37 somewhat above the liquid level, and are positioned so that they will receive eggs which roll down the sloped bottoms of the cages 10,10' as shown in FIG. 2. The egg conveyor belts 33 are preferably continuous with the return portions 32 positioned below them as shown in FIGS. 1 and 2. This construction and arrangement permits the eggs to be carried to a single location for handling. The sides 36,37 rise to a suitable height above the level of liquid so as to form a space or volume which, with the manure-disposal system, contains relatively cool, moist air. I have found that this cool, moist air begins to cool the eggs on the conveyor belts 33 almost as soon as they are received, and greatly improves the quality, life, and value of the eggs.

The troughs 20,22 may be formed from suitable sheet metal and plastic, or comparable material, on the outside and a heat insulating material, such as rigid urethane or styrene foam, inside the bottom 35 and sides 36,37. Insulation may also be placed above the heating ducts 27 if desired or needed. Portions of the walls forming the troughs 20,22 may be joined by suitable seals 40 as indicated in FIG. 3. As shown in FIG. 3, the seal 40 extends slightly above the top of the side 36 so that moisture flows inward and downward as shown by the arrow.

Manure from the cages 10,10' is dropped into the liquid carried in the troughs 20,22. I prefer that this liquid have added chemicals and be chilled or cooled, as the cool liquid and chemicals help to stabilize the manure and reduce bacterial growth and consequent breakdowns of materials. Such a reduction of growth and breakdowns reduces the loss of valuable food and fertilizing materials, and reduces surface activity and its consequent air contamination. The cool liquid also reduces the loss of gases by increasing their solubility, and reduces the loss of liquids by decreasing their vapor pressure. The cool liquid also reduces the multiplication of disease producing organisms. And very importantly, the cool liquid cools and dehumidifies the poultry house. The cool liquid causes an atmospheric movement toward its surface because of condensation of water vapor. This movement helps to isolate the poultry from any contaminated air around the troughs 20,22 and provides a cool layer of air between the liquid surface and the cage bottoms or floors. Since the liquid provides an appreciable cooling body or area, I have found that heating may be desirable or necessary, particularly in cold weather. This heating is provided by the heating ducts 23 beneath the trough 22 and above the lower cages 10', and by the heating ducts 27 in the roof 26 above the upper cages 10. These heating ducts 23,27 extend longitudinally above the cages 10',10. The heating ducts 23,27 may be made integral with or an added part of the trough 22 and the roof 26, and may use electrical heating wires or hot gas or liquid. Thus, the cages 10,10' can be provided with a warm atmosphere above the cage bottoms or floors, and a cool, dry atmosphere between the cage bottoms and the liquid below. This feature of my invention provides a poultry house with a climate or atmosphere that can be maintained at the desired conditions of temperature and humidity. The cooling and dehumidifying can be controlled by the temperature and rate of flow of the liquid, and the heating can be controlled by the temperature of the heating medium in the heating ducts. Little stratification occurs because of gentle convection currents and the effects of radiation from the warm heating surfaces downward plus absorption into the troughs of radiation from upper portions of the building. Thus, with the exception of the cool air trapped within the troughs and utilized to chill the eggs, the entire house is held to relatively uniform temperature and humidity both within the cages and outside the cages.

I prefer water as the liquid, as it is readily available and stabilizes the manure satisfactorily. Since it is desirable to conserve the water, I prefer to remove some of the solids from the water after passing each row of cages or any predetermined number of cages, and then recirculate the water. If the row of cages is not too long, the trough may be horizontal, and the liquid supplied at one end of the trough with sufficient depth and velocity to cause it to flow the length of the trough and carry manure to the other end. Or, the trough may be provided with a slight slope in a downward direction toward the end where the liquid is removed. In either case, the liquid should have sufficient depth or velocity to carry the manure dropped into it by all of the cages positioned above the trough. I prefer to remove as much of the solids as possible from the liquid on a continuing basis, and recirculate the liquid after the solids have been removed. FIG. 4 shows a liquid flow diagram of my manure-disposal system with one embodiment of an arrangement for removing the solids from the liquid. Liquid from one or more troughs in the poultry houses is conveyed by one or more pipes 50 to a sump or tank 52. A pump 54 is positioned in the tank 52, and is supplied with the liquid at its indicated inlet 55. The pump 54 is arranged so that the heavy solids and material move downward and outward and are discharged by a pipe 56 into a separating tank 58. These heavy solids drift or move downward under the influence of gravity to the bottom of the tank 58, and are scraped or carried to a heavy solids trough 60 by means of flights 62 which move on a continuous belt to the left along the bottom as indicated by the arrows. The heavy solids in the heavy solids trough 60 may be removed in any suitable fashion, as by the screw conveyor shown, or by draining. Light materials in the tank 52 are pumped upward and inward and discharged at an outlet trough 64 (around the pump shaft) into the tank 58. These light materials float on the liquid, and are carried by the flights 62 which move to the right along the top of the liquid to a scum or light materials discharge pipe 66. When light materials are to be removed, the pipe 66 is rotated counterclockwise so that its opening 68 is positioned slightly below the level of the liquid in the tank 58. The light materials can then flow into the pipe 66 and be carried away through an opening at one end of the pipe 66 to a discharge pipe (not shown). The remaining liquid in the separating tank 58 is relatively clean and free of manure, except for matter in suspension or in solution. This liquid in the tank 58 flows back into the tank 52 through a spill-back weir 72. A dam 74 may be positioned around the weir 72 so that the light materials on top of the liquid cannot flow over the weir 72 back into the tank 52. Thus, the light materials and heavy solids are removed from the liquid, and the relatively clean liquid (which may contain materials in solution or in suspension) is returned to the tank 52. This liquid is pumped either continuously or intermittently through an outlet 76 to a recirculating or outlet pipe 78. The pipe 78 carries the liquid back to the troughs in the poultry houses for recirculation. The light materials and liquid drawn off in the pipe 66 may be used as liquid fertilizer. The heavy materials and solids drawn from the trough 60 may be dried and used as fertilizer or as animal feed. The recirculated liquid may be periodically replaced by new liquid, and used as liquid fertilizer, or treated to utilize it in a more desirable manner. I have found that the amount of recirculated liquid increases because of the liquid in the manure from the cages and because of moisture condensed from the air.

In order to cool or chill the liquid supplied to the troughs, I provide cooling coils 80 in the tank 52. The coils 80 are supplied with a suitable refrigerant. For chicken manure, I have found that a liquid temperature of 45° F. is satisfactory to stabilize the manure and prevent breakdown by bacterial or other action. However, my invention is not to be limited to any specific temperature of the liquid. The cool liquid from the pump 54 is connected to the troughs in the poultry houses for flow under the cages. Pumps may be provided at suitable locations in order to supply this liquid to the troughs at the necessary velocity. I have found that a liquid flow of 1 foot per second with a depth in the troughs of at least 1 inch adequately removes the manure. The heating and cooling diagram of FIG. 5 shows how my manure-disposal system and its air-conditioning can be easily and efficiently combined with other equipment in a poultry house. In many locations, it is desirable or essential to have local independent electrical power. Such power can be provided by any sort of prime mover such as a gas or diesel engine 84 which drives an electrical motor-generator 86 through an overrunning clutch 85. The motor-generator 86 normally functions as an electrical generator, and its shaft turns a coupling 87 (which may be a right angle drive and which may have step up or step down gearing) that operates the pump 54. The electrical power supplied by the motor-generator 86 operates the electrical equipment in the poultry house, and may also operate a similar motor-generator associated with another diesel engine and pump, if that engine fails or stops. Or, the equipment may be used in association with electrical power supplied by a utility company. Heat from the engine exhaust and cooling system may be used to operate an absorption refrigeration unit 88. This unit 88 cools the liquid in the manure-disposal system through the cooling coils 80. Additional heat to operate the unit 88 may be supplied from a boiler 90. Heat from the unit 88 may be utilized in the heating ducts 23,27, or may be cooled by an evaporative cooler 91. The boiler 90 may also supply heat to the heating ducts 23,27. It will thus be seen that my manure-disposal system can be easily incorporated into an air-conditioning and heating system and an electrical generating system to provide an improved and efficient poultry or animal house.

FIGS. 6 and 7 show cross-sectional views of further embodiments of an egg conveyor which are particularly adapted for use with my manure disposal system. In FIG. 6, an egg-conveyor structure 94 is provided with an egg-conveyor belt 95 having a return portion 96. The structure 94 provides a trough 97 for carrying cool liquid. The cool liquid may be part of the liquid used in my manure-disposal system, and serves to provide a space or volume of cool, moist air around the eggs being conveyed from the cages to the egg processing room. The entire structure 94 is relatively cool, and any moisture tending to condense on the structure 94 may be permitted to drip down into a trough 98. The trough 98 may be formed in the floor of the poultry house, as shown, or may be a fabricated structure, and may be part of my manure disposal system. The liquid in the trough 98 may be part of the liquid in my manure disposal system.

FIG. 7 shows a view of another structure 100 for conveying eggs, and for supplying a cool, moist space or volume around the eggs. The structure 100 includes an egg-conveyor belt 101 with a return portion 102. A liquid carrying trough 103 is positioned between the belt 101 and portion 102. An air space or insulated space 104 may be provided around the trough 103 to reduce moisture condensation on the structure 100. And, as before, the liquid in the trough 103 may be part of the liquid in my manure-disposal system.

It will thus be seen that my manure-disposal system provides improved means for removing manure, and for conserving the food and fertilizer values or qualities of the manure, particularly in poultry houses. This system utilizes a cooled liquid which provides cooling and dehumidifying for the poultry house, particularly in warm weather and climates. The cooled or chilled liquid also eliminates all of the undesirable qualities of the manure, and reduces its disagreeable and detrimental effects to humans and chickens, and prevents the manure from attracting rodents and scavengers. The disposal system stabilizes the manure almost at once, so that its valuable qualities are not lost. In particular, the valuable nitrogen in the chilled manure does not break down into other compounds, such as ammonia, which are released and lost. This is particularly important in retaining the food and fertilizer values of the manure. The manure disposal system in accordance with my invention catches all the manure, many feathers, and much feather dust, and conveys them to a convenient location where light and heavy solids may be removed. My system is not blocked or clogged by the feathers and dust, so that the cooling and dehumidifying are not affected. In addition, heating with ducts is not affected. Thus, my cooling and heating system permits the feathers and feather dust to settle into the manure troughs and to be removed rather than be blown over the poultry house by ventilating fans. Also, my manure disposal system permits tiers of cages to be positioned above each other, since the manure from an upper tier of cages is removed by the liquid and does not contaminate the tier of cages below. And finally, my manure disposal system eliminates the necessity for the formerly difficult, frequent and costly cleaning of manure from poultry houses by men and machines.

Persons skilled in the art will appreciate that modifications may be made to my manure disposal system. For example, the liquid-carrying trough may take any number of shapes and cross-sectional configurations, depending upon the shape and size of the cages used. The egg conveyors may be completely separate, or may be attached to the cages, or may be attached to the structure of the liquid-carrying troughs. If desired, the liquid need not be recirculated, but may be constantly replaced by fresh liquid. In such a case, the liquid containing the manure would be directly utilized without having the heavy and light materials removed. In either case, the liquid may be supplied continuously or intermittently. Various liquid temperatures may be maintained, depending on the environmental conditions, the rate of liquid flow, and the amount of manure dropped into the liquid. Therefore, while my invention has been described with reference to particular embodiments, it is to be understood that modifications may be made without departing from the spirit of the invention or from the scope of the claims.

I claim:

1. For use in an animal house having a floor area with a plurality of openings, a manure disposal system comprising:
   a. a trough positioned beneath said openings, said trough having a bottom and sides arranged to form a liquid holding structure that is open at the top for receiving manure from said openings;
   b. means connected to at least one location in said trough for supplying a cool liquid to said trough;
   c. means connected to another location in said trough for removing liquid from said trough; and
   d. means connected between said trough locations for conveying said liquid from said other location back to said one location for recirculation through said trough.

2. The system of claim 1 wherein said liquid flows through said trough and said conveying means substantially continuously.

3. The system of claim 1 wherein said liquid flows through said trough and said conveying means intermittently.

4. The system of claim 1, and further comprising means connected to said conveying means for removing manure material from said liquid before it is recirculated through said trough.

5. For use in an animal house having a floor area with a plurality of openings, a manure disposal system comprising:
 a. a trough positioned beneath said openings, said trough having a bottom and sides arranged to form a liquid holding structure that is open at the top for receiving manure from said openings;
 b. first means connected to first and second separated locations in said trough for removing liquid from said trough at said first location and supplying said removed liquid to said trough at said second location, and thereby provide a circulation of liquid through said trough and said first means; and
 c. and second means connected to said first means for removing manure from said liquid.

6. The system of claim 5, and further comprising third means operatively associated with said first means for cooling said liquid.

7. A manure disposal system for use in a poultry house having a first tier of poultry cages and a second tier of poultry cages positioned above said first tier, each of said tiers comprising a plurality of poultry cages positioned side-by-side in parallel longitudinal directions, said disposal system comprising:
 a. a first trough positioned beneath said first tier of cages and extending in said longitudinal direction, said trough having a bottom and sides arranged to form a liquid holding structure that is open at the top for receiving manure from said first tier of cages;
 b. first heating means positioned above said first tier of cages and extending in said longitudinal direction;
 c. a second trough positioned above said first heating means and beneath said second tier of cages and extending in said longitudinal direction, said second trough having a bottom and sides arranged to form a liquidtight structure that is open at the top for receiving manure from said second tier of cages;
 d. second heating means positioned above said second tier of cages;
 e. means connected to one end of said first trough and to one end of said second trough for supplying cool liquid to said troughs;
 f. means connected to the other ends of each of said troughs for removing liquid from said troughs; and
 g. means connected between said means for supplying cool liquid and said means for removing liquid for recirculating said liquid through said troughs.

8. The system of claim 7 wherein said recirculating means includes cooling means and manure removal means.

9. A manure disposal system for use in a poultry house having a first tier of poultry cages and a second tier of poultry cages positioned above said first tier, each of said tiers comprising a plurality of poultry cages positioned side by side in parallel longitudinal directions, said disposal system comprising:
 a. a first trough positioned beneath said first tier of cages and extending in said longitudinal direction, said trough having a bottom and sides arranged to form a liquid holding structure that is open at the top for receiving manure from said first tier of cages;
 b. first heating means positioned above said first tier of cages and extending in said longitudinal direction;
 c. a second trough positioned above said first heating means and beneath said second tier of cages and extending in said longitudinal direction, said second trough having a bottom and sides arranged to form a liquidtight structure that is open at the top for receiving manure from said second tier of cages;
 d. second heating means positioned above said second tier of cages;
 e. means connected to one end of said first trough and to one end of said second trough for supplying cool liquid to said troughs;
 f. means connected to the other ends of each of said troughs for removing liquid from said troughs;
 g. means connected between said means for supplying cool liquid and said means for removing liquid for recirculating said liquid through the troughs; and
 h. an egg conveyor positioned adjacent each side of said first and second tier of cages.